United States Patent [19]

Fontaine et al.

[11] 3,715,728

[45] Feb. 6, 1973

[54] SIMULATION TIMING CONTROL SYSTEM

[75] Inventors: Bernard J. Fontaine, Ris-Orangis; Alonso Gabriel, Antony, both of France

[73] Assignee: International Standard Electric Corporation, New York, N.Y.

[22] Filed: July 10, 1970

[21] Appl. No.: 53,746

[30] Foreign Application Priority Data

July 24, 1969 France ................................ 6925251

[52] U.S. Cl. ................................................ 340/172.5

[51] Int. Cl. ................................................ G06f 15/16

[58] Field of Search .........340/172.5, 146.1; 235/153

[56] References Cited

UNITED STATES PATENTS

| | | | |
|---|---|---|---|
| 3,376,550 | 4/1968 | Wong et al. | 340/172.5 |
| 3,343,141 | 9/1967 | Hackl | 340/172.5 |
| 3,535,683 | 10/1970 | Woods et al | 340/172.5 |
| 3,415,981 | 12/1968 | Smith et al. | 340/172.5 |
| 3,311,890 | 3/1967 | Waaben | 340/172.5 |
| 3,286,239 | 11/1966 | Thompson et al | 340/172.5 |
| 3,343,135 | 9/1967 | Freiman et al. | 340/172.5 |
| 3,551,891 | 12/1970 | Hermes et al. | 340/172.5 |
| 3,387,276 | 6/1968 | Reichow | 340/172.5 |
| 3,500,328 | 3/1970 | Wallis | 340/172.5 |
| 3,308,439 | 3/1967 | Tink et al. | 340/172.5 |
| 3,312,951 | 4/1967 | Hertz | 340/172.5 |

*Primary Examiner*—Paul J. Henon
*Assistant Examiner*—Mark Edward Nusbaum
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

The simulation of real time program within computer systems such as telephone switching systems is accomplished by performing the program under the control of a timing clock without direct relation to the real time. A timing indicator is used to follow the progress of the program, the indicator being settable to control the duration of the test programs.

2 Claims, 1 Drawing Figure

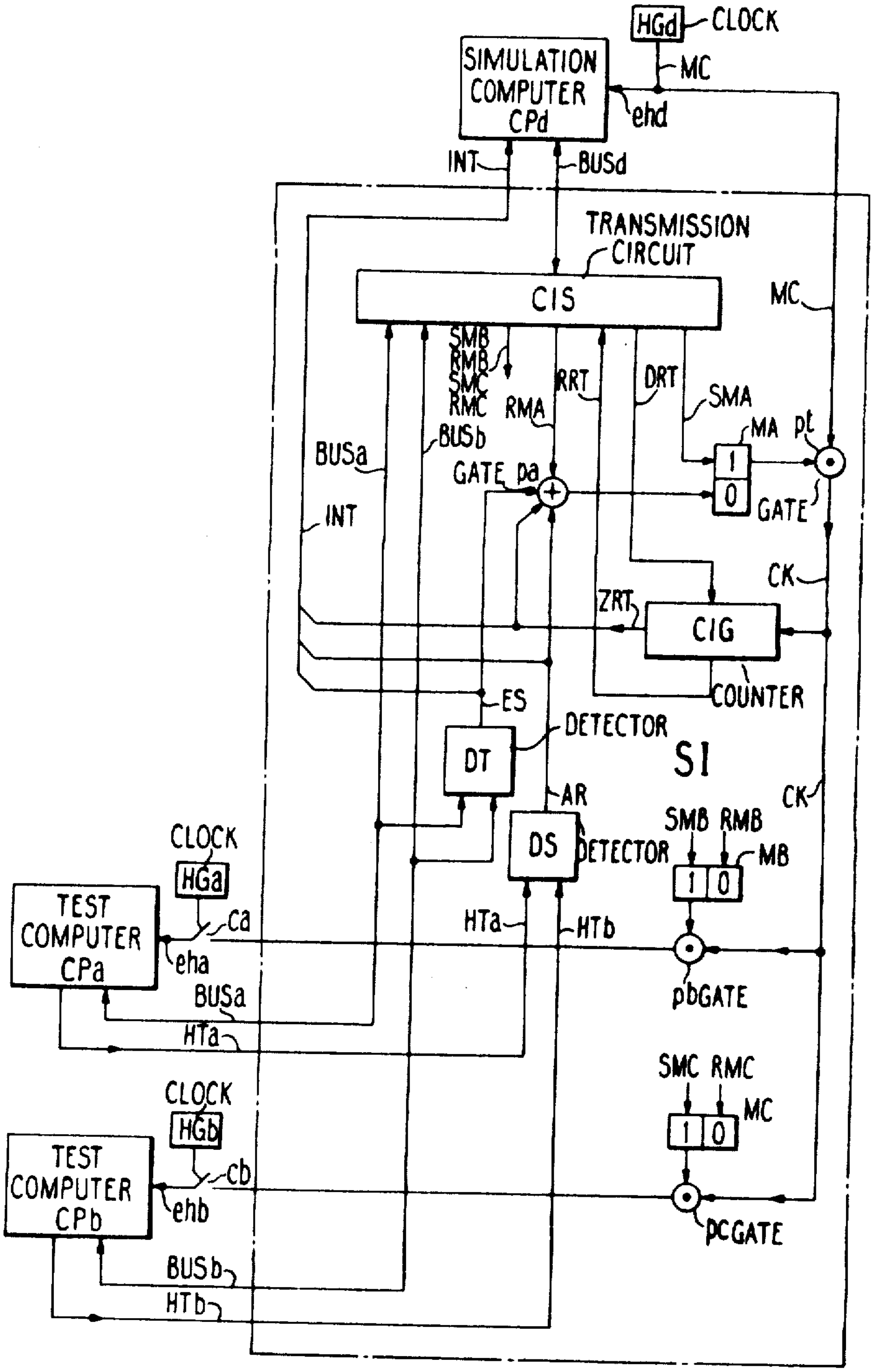
*Inventor*
Bernard J. Fontaine - Gabriel Alonso

SIMULATION TIMING CONTROL SYSTEM

The present invention concerns a simulation system, and more particularly a simulation system applicable to checking of programs of "real time" data processing systems, such as circuits for data switching systems.

A real time data processing system is, in general, a system receiving input data whenever these originate, processing them and, in response, providing output data after prescribed and relatively short delays. Systems of this type, as per a more and more well-known art, are organized around one or several stored program central units. The detection of the input data and the transmission of the output data are entrusted to specialized peripheral units connected to a standardized input/output channel of each central unit.

Telephone switching systems provide examples of real time systems. Indeed, a telephone exchange is now currently realized in the form of a connection network, of junctors and of at least two central units (for reliability purposes). The junctors are units associated with the lines and circuits in order to receive and transmit signals. The connection network enables the interconnection of junctors, so as to establish telephone call connections. The central units, by means of peripheral units of the scanner type, receive from the junctors data relating to the condition of the lines and circuits. By means of peripheral units of the allotter type, they give orders to the connection network and to the junctors, for establishing call connections and for sending signals.

The connection network, the junctors, the scanners and the allotters are standardized in a given system; and, adaption to every application directs itself mainly in the elaboration of appropriate programs for the central units. Before being put into application, the programs must be checked. In a well known manner, this checking is performed by programmed simulation.

The simulation consists in loading the programs to be checked into one or several test computers which are void of peripheral units, and, in loading a simulation program into a simulation computer connected to the input/output channels of the test computers. It is preferred that the test computers be of the same type as the computers for which are intended the programs to be tested. For example, the test and simulation computers may be of the type known as the ITT 1600 or ITT 3200. Use of computers of this type are shown in U.S. Pat. No. 3,557,315, issued January 1971 to S. Kobus et al. The simulation program is such that, seen from the test computers, the simulation computer "simulates" peripheral units in activity. It makes it possible, therefore, in the simulation computer, to originate input data meant for the test computers, and to receive output data originated from test computers. Moreover, it will enable checking whether the output data do indeed respond to the input data and will use them for subsequently originating new input data.

By way of example, still in the case of telephone application, the simulation program will make it possible to originate the data characterizing a call (lifting telephone handset), then, to receive the data normally meant to control connection of the calling line to a junctor (digit receiver), and subsequently, to simulate the reception of the called number in this junctor.

Moreover, for checking purposes, the simulation computer will generally print all the input and output data.

Simulation, practiced thus, for the real time data processing systems, shows however great difficulties which have as their origin the time factor. Indeed, a real time system has an internal clock to which the program refers for deciding which operations to perform. The scanning providing the input data is thus started periodically; the output data, which control the sending of the telephone signals, are distributed at a determined rate, etc. Thus, the system is dependent upon the response delays of its peripherals. A scanner, for instance, must provide input data at a sufficient rate. If not, the program waits (or at least loses time), and this may bring in disturbances. Moreover, the interpretation of an outside event signalled by an input data depends upon its place in the "time" of the system (the opening of the loop of the telephone line can characterize either a digit impulse or an end of call; and, the system refers to its time for deciding it).

The result is that the simulation must first comply with the time of the real time system. Since it replaces peripheral units, it must reproduce the response delays of these units. This might involve almost unsurmountable difficulties when these peripheral units are very fast.

On the other hand, the simulation must also bear upon the time. Since the response of the real time system to a given event depends upon the place of the event in the time of the system, it is necessary that the simulation should be able to proceed with marginal tests implying the originating of a simulated event and the sending of a corresponding input information at an instant determined with precision in relation to the time of the real time system. This is the case namely when the simulation must proceed with repeated tests of one same operation. Each test must find again the exact conditions of the preceding ones and consequently be placed in the time with a quasi-absolute precision. Solution of this difficulty would require that the simulation computer (which has its own proper time) also knows with precision the time of the system being tested; but this appears to be impracticable.

The function of the simulation network is to develop programs for control and design of a telephone system and to determine parameters of such a system, in the form of numbers of circuits necessary, etc. Such systems are described in the text "Fundamental Principles of Switching Circuits and Systems" published by the American Telephone and Telegraph Co. On pages 410 and 411, such simulators and their functions are described generally under the headings "Programs to Write Programs" and "Machines to Design Machines." Further, in the Bell Telephone System Monograph 3149 by H.N. Seckler and J.J. Yostpille (manuscript received July 30, 1958), pages 55–56 describe simulation by the use of a large general purpose digital computer used to simulate the physical system.

The present invention has for object a simulation system bringing a full solution to these difficulties, and this, in a particularly simple and economical manner.

According to the present invention, the one or the several test computers are placed within the well-known single impulse mode and a distributing circuit receives clock impulses from the simulation computer and retransmits them, under control of a switching circuit, to the single impulse inlet of each of the test computers; these arrangements make it possible, with the help of the switching circuit, to stop somehow the time of the test computers each time that the needs of the simulation require it, so as to place "out of the time" the operation of the simulation computer and make it possible, consequently, to realize a simulation complying with and controlling integrally the time of the test computers.

According to another feature of the invention, a counter counts the number of clock impulses transmitted to the test computers and therefore follows the evolution of the internal time of the test computers; this counter is accessible to the simulation computer and it enables this latter to know the "time" of the test computers.

In a preferred embodiment of the invention, the foregoing counter is a backward counter, set into an appropriate position by the simulation computer at the beginning of a test sequence, and stepping backward at each clock impulse transmitted to the test computers; so as to finally reach zero position, after the test computers will have received a required number of clock impulses. Advantageously, the counter, in zero position, operates directly upon the switching circuit in order to stop the sending of clock impulses to the test computers. Signalling (program interruption) is sent simultaneously in the direction of the simulation computer. By these means, the simulation computer has full control of the time evolution in the test computers.

Different other features of the invention will become apparent from the description that follows, given by way of non-limiting example, in conjunction with the accompanying drawing which is a block diagram of a simulation system realized according to present invention.

The simulation system in the accompanying figure is essentially made up of: a simulation computer CP*d* and its clock HG*d*, a first test computer CP*a* and its clock HG*b*, as well as a simulation link equipment SI.

The simulation computer CP*d* has an input/output channel BUS*d* connected to a simulation interface or transmission circuit CIS, in the equipment SI. Likewise, the input/output channel BUS*a* of computer CP*a* and the input/output channel BUS*b* of computer CP*d* are connected to the transmission circuit CIS. The transmission circuit CIS is comprised of a plurality of logic gates. These gates are connected to the computer input and output busses to control the flow of addresses and information. Circuit CIS decodes, by means of its internal coding gates, the address information appearing on the address conductors of a bus and enables corresponding information gates to route information data accordingly. In some cases this information data comprises only one significant bit giving one particular control signal such as those indicated as SMA, RMA, SMB, RMB, SMC and RMC. Such gating circuits are quite well known in the computer art.

It will be assumed that a program to be tested has been loaded into the computer CP*a*, through means not shown in the figure. The computer CP*b* contains the same program to be tested, or a program already tested which relates to the same application. A simulation program is loaded into the simulation computer CP*d*.

If it is assumed that the three computers are in operation, the circuit CIS enables the computer CP*d* to receive the data, transmitted along the channels BUS*a* and BUS*b* by the computers CP*a* and CP*b*, in retransmitting them along channel BUS*d*. Likewise, the circuit CIS makes it possible to transmit the data, sent by computer CP*d* along its channel BUS*d*, either to the computer CP*a* through channel BUS*a*, or to the computer CP*d*, through channel BUS*b*. The computer CP*d* is thus able, according to the simulation program it contains, to "simulate" peripheral units, in activity, to which would be connected the test computers CP*a* and CP*b* through their input/output channels.

The invention adds to such an arrangement, known in itself, means enabling the simulation computer CP*d* to control very closely the time of the test computers CP*a* and CP*b*. These means, contained in the unit SI, comprise mainly bistable circuits MA, MB and MC, gates *pa*, *pb*, *pc* and *pt*, a counter CIG, a detector DT and a detector DS. The counter CIG is also well known in the electronic usage. The counter includes a set of bistable circuits which can be loaded with binary coded information through link DRT and read through link RRT. It includes backward counting or subtraction circuit so that a value 1 is subtracted from the count on each clock impulse CK. The counter includes a gating circuit which produces a signal ZRT when the counter has stepped back to a zero condition, with all its bistable circuits in their zero condition.

The detector DT is a sensing circuit which may be embodied in the form of an "OR" gate the inputs of which are connected to each of the address conductors coming from computers CP*a* and CP*b* in busses BUS*a* and BUS*b*. When one of these computers initiates an input or output and sends an address, this OR gate thus delivers signal ES. In the same way, detector DS can also be an "OR" gate delivering signal AR when it receives one of the signals HT*a* or HT*b*. This explanation constitutes one way of embodying those detectors, but other approaches could be used.

As can be seen in the figure, the computer CP*d* receives, upon a clock inlet *ehd*, signals MC originated by its clock HG*d*. These clock signals are regular impulses controlling the operations accomplished in the computer. To each impulse there corresponds a data processing elementary operation. Moreover, their repetition period being constant, these impulses constitute the basis of an internal time scale, or more simply, of the time of the computer CP*d*. As they are regular, the time of the computer is continuous and its operation proceeds at a constant rhythm.

The signals MC are also transmitted to the gate *pt* of the unit SI. This gate, of the "AND" type is controlled by the bistable circuit MA. It is enabled if the bistable MA is in position 1 and, in response to each impulse MC, it provides an impulse CK.

On the other hand, the computer CP*a* has also a clock inlet *eha* controlled, according to position of a switching unit *ca*, either by the signals of its clock HG*a*, or by the signals CK provided by the simulation unit SI. In normal operation, the switching unit *ca* is in the position shown in the figure and the computer CP*a* operates in continuous manner. Within the scope of the simulation system described above, the switching unit *ca* is triggered and the operation of the computer CP*a* is controlled by the impulses CK, originated from clock HGd of the simulation computer (assuming the gate *pb* is conducting).

A similar arrangement (clock HG*b*, switching unit *cb*, gate *pc*) is provided for the computer CP*b*.

Consequently, it is seen that the operation of the two test computers CP*a* and CP*b* is thus placed under the control of the bistable MA. It is just necessary to set this bistable into position 0 for interrupting the operation of the two computers, by depriving these latter of clock impulses; whereas operation of the simulation computer proceeds. It is worth considering also that these interrupting arrangements enable the stopping the time of the two test computers. Viewing the interruptions from the test computers point of view, these arrangements enable rendering null the execution of operations occurring during the interruption period at simulation computer.

The bistable MA is set into position 1 by an order transmitted by the simulation computer CP*d* upon its input/output channel BUS*d* and received by the circuit CIS. This order, decoded in CIS, results into a signal SMA which sets directly the bistable MA into position 1.

The bistable MA is set into position 0 by a gate *pa*, of the "OR" type, grouping four conditions. The first one, RMA, is an order from the computer CP*d* transmitted like SMA. The condition ES is originated from the detector DT. The condition AR is originated from the detector DS. The condition ZRT is originated from the counter CIG.

The counter CIG receives the impulses CK and counts them. It can be loaded (set into a given position) by an order from the simulation computer CP*d*, transmitted along the channel BUS*d*, received by the circuit CIS and routed onto the link DRT. The computer CP*d* can also read the position of the counter CIG, by an order transmitted along the channel BUS*d* and received by the circuit CIS. This latter, in response, transmits along the channel BUS*d* the position of the counter CIG which it receives through the link RRT. It will be easily understood that these arrangements will enable the simulation computer CP*d* to know the time of the test computers CP*a* and CP*d*, since the counter CIG receives and counts the computers CP*a* and CP*d*, since the counter CIG receives and counts the impulses CK transmitted, by way of clock impulses, to the said computers.

Moreover, in a preferred embodiment of the present invention, the counter CIG is a backward counter having an outlet upon which is provided a signal ZRT when it occupies position 0. This signal ZRT, through gate *pa*, sets the bistable MA into position 0.

Thus, the bistable MA being initially in position 0, the two test computers being stopped, the simulation computer CP*d*, without any time constraint, can prepare the development of a simulation operation; then, it sets the counter CIG into a position corresponding to the number of operations whose execution is permitted in the test computers; finally, it sets the bistable MA into position 1. The gate *pt* is enabled and provides the impulses CK. Each of them controls an operation in the computers CP*a* and CP*b* and makes the counter CIG step back by one step. When the counter CIG reaches position 0, the computers CP*a* and CP*b* will have received the required number of impulses. At this instant, the counter CIG provides the signal ZRT, and this latter, through gate *pa*, restores the bistable MA to 0. The gate *pt* ceases providing the impulses CK, and operation of the computers CP*a* and CP*b* is interrupted.

The signal ZRT is also transmitted along a conductor of an interrupt line INT, onto the simulation computer GP*d*, in order to inform this latter, by a program interruption, that the operations it had ordered are accomplished.

The programmed simulation specialists will immediately see the great advantages resulting from such an arrangement making it possible for the simulation to control and to check the operation of the test computers up to level of the elementary operation, or, of the smallest time interval. It is possible namely to control each time a single elementary operation.

The detector DT is connected in parallel to the input/output channels BUS*a* and BUS*b* of the computers CP*a* and CP*b*. Its function is to detect the sending of an information (output operation) of the request of an information (input operation), by one or the other of the test computers. As soon as one of the computers CP*a* or CP*b* begins an input/output operation, the detector DT provides the signal ES. Immediately after, through gate *pa*, the bistable MA passes into position 0. The time stops in the test computers. The signal ES is also transmitted along a conductor of the interrupt line INT, so as to inform the simulation computer CP*d*. This latter has all the time necessary for reading (by BUS*d* and CIS) the data sent on the channels BUS*a* and BUS*b*, for providing data in response, for possibly reading the position of the counter CIG, for accomplishing any other necessary operation and finally for restoring the bistable MA into position 1.

The stop detector DS has a function similar to the detector DT. It receives signals HT*a* and HT*b* provided by the computers CP*a* and CP*d* in case of internal stopping. A computer stops its operation in case of failure or in response to a programmed internal order (conditional halt), when certain conditions are met. It then provides the signal HT*a* or HT*b*. In response, the detector DS provides the signal AR, and this latter sets the bistable MA into position 0 and marks a conductor of the interrupt line INT. The operation of the two test computers CP*a* and CP*b* is then interrupted and the simulation computer CP*d* will be able to accomplish any necessary operation, before finally restoring the bistable MA into position 1.

On the other hand, as can be seen in the figure, transmission of the impulses CK to the test computers is still conditioned by the gates *pb* and *pc*. These gates are controlled by the bistables MB and MC, of the same type as MA. These bistables are controlled by the simulation computer CP*d*, through the input/output channel BUS*d*, through circuit CIS and through the conductors SMB, RMB, SMC, RMC. It is immediately seen that these means enable the simulation computer CP*d* to deprive individually the test computers CP*a* and CP*b* of clock impulses. They therefore make it possible, say for example by putting MB into position 0 and by blocking the gate *pb*, to interrupt the operation of a test computer, CP*a*; whereas the other test computer CP*d*, operates. Such an arrangement offers two interesting possibilities: it enables placing one of the test computers out of the simulation; it also enables simulating any operation interruption of a test computer and, in a general way, introducing delays in the operation of one test computer with respect to the other one.

The simulation system just described above makes it possible therefore, with the help of simple means (bistable MA, gate *pt*, switching units *ca* and *cb*) to control the operation of the test computers as from the simulation computer. A computer (CIG) makes it possible to follow the operation of the test computers and to interrupt it when these latter have accomplished the prescribed number of operations. A detector DT enables stopping the operation of the test computers when one of them starts an input/output operation. A detector DS accomplishes the same function when one of the test computers stops by itself. In these three cases, stopping is obtained simply by setting the bistable MA into position 0. A program interruption alerts the simulation computer, whilst specifying the cause of the stopping.

These arrangements will completely free the simulation of the time factor, by stopping the time of the test computers, every time that the simulation computer must intervene.

Moreover, other simple means (bistables MB, MC, gates *pb*, *pc*) make it possible to act individually upon the operation of the test computers and namely to stop one for whatever duration; whereas the other one operates.

It is to be understood the foregoing description of a specific embodiment of this invention is made by way of example only and is not to be considered as a limitation on its scope.

We claim:

1. A simulation network for checking a test computer containing a real time program to be controlled, a simulation computer programmed to simulate peripheral units connectable to said test computer, the invention comprising a simulation control unit for connection to the simulation computer, a real time clock connected to control the operation of said test computer and a timing clock connected to control the operation of said simulation computer, switching means operable to disconnect the clock input of the test computer from the real time clock and for connecting clock input of the test computer to said simulation control circuit, further circuit means for actuating said simulation control circuit to transmit signals from said timing clock to said test computer, to operate said test computer in response to said timing signals, control means responsive to a signal from the simulation computer for enabling said simulation control circuit to control the transmission of signals from said simulation computer to said test computer without regard to real time, a counter connected to said timing clock to count timing clock signals transmitted to the test computer, further control means for enabling the simulation computer to control the position of the counter, and means for reading the position of this counter, whereby the simulation computer can keep track of the passage of the timing clock time.

2. A network as defined in claim 1 wherein said control means associated with said counter including means for producing a first stop signal when the counter reaches a defined position, further control means operable to control the switching means so as to interrupt the transmission of timing clock signals to the test computer, both said control means enabling the simulation computer when said counter reaches a predetermined position to cause the transmission of a predetermined number of timing clock signals to the test computer, and in which the said counter is capable of a step-by-step backward operation in response to the timing clock signals transmitted to the test computer from a counter setting into which it has been set by the simulation computer, and a control outlet being activated when the counter reaches a zero position whereby the transmission of a given number of timing clock signals to the test computer may be effected by programming the simulation computer to load the given number into the counter.

* * * * *